July 8, 1941.  W. E. BOUTON  2,248,421
WEED CUTTING IMPLEMENT
Filed May 22, 1940
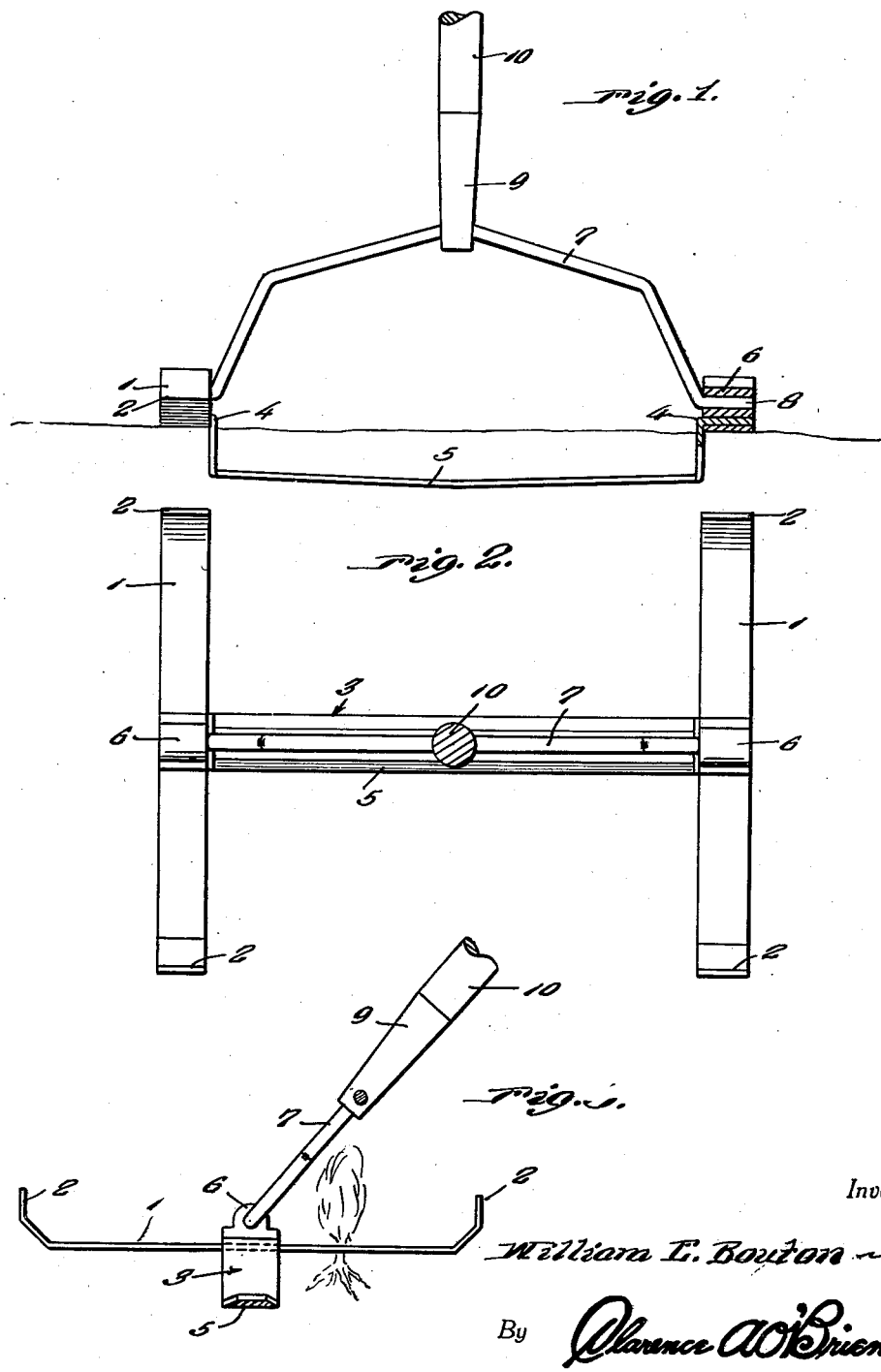
Inventor
William E. Bouton
By Clarence A. O'Brien
Attorney Patented July 8, 1941

2,248,421

UNITED STATES PATENT OFFICE 2,248,421

WEED CUTTING IMPLEMENT

William E. Bouton, Atascadero, Calif.

Application May 22, 1940, Serial No. 336,629

2 Claims. (Cl. 97—68)

My invention relates to improvements in weed cutting implements for garden use and the particular object in view is to provide an efficient, simply constructed, and easily manipulated device for cutting weeds at a uniform depth below the surface of the ground.

To the accomplishment of the above, and subordinate objects presently appearing, a preferred embodiment of my invention has been illustrated in the accompanying drawing, set forth in detail in the succeeding description and defined in the claims appended hereto.

In said drawing:

Figure 1 is a view in front elevation and partly in section of the preferred embodiment of my invention, Figure 2 is a view in top plan, with the handle shown in section, and Figure 3 is a view in longitudinal section.

Referring to the drawing by numerals, the implement of my invention, as illustrated, comprises a pair of elongated, bar-like runners, or skids 1, having upturned ends 2 and spaced apart laterally in parallel side-by-side relation by a cutter bar 3 of flat metal extending between said runners, centrally thereof and transversely of the same, said bar having right angled ends 4 suitably secured on top of said runners, and a cutter blade 5 between said ends of double-edged type adapted to be suspended by said ends below said runners. A pair of bearing blocks 6 are suitably secured on top of the ends 4 of the bar 3. A handle carrying bail 7 of rod-like material extends between said bearing blocks 6, said bail having outturned ends forming trunnions 8 journalled in the bearing blocks 6 so that said bail is swingable thereon lengthwise of the runners 1. The bail 7 extends through one end of a metal ferrule 9 suitably fixed to the same. A handle bar 10 is secured in said ferrule in the usual manner to extend therefrom. Preferably the cutter bar 3 inclines downwardly from its ends to its transverse center to facilitate its cutting into the surface of the ground.

The manner in which the described implement is used and operated will be readily understood. The device is pushed or pulled over the ground by means of a handle 10 to force the cutter bar 5 into the ground until the runners 1 are flat on the surface of the ground. The implement is then either shoved or pulled so that the blade 5 cuts the weeds below the surface of the ground. The runners serve to maintain the blade 5 at a uniform depth in the ground as will be clear.

The foregoing will, it is believed, suffice to impart a clear understanding of my invention without further explanation.

Manifestly the invention, as described, is susceptible of modification without departing from the inventive concept, and right is herein reserved to such modifications as fall within the scope of the subjoined claims.

What I claim is—

1. In an implement of the class described, a pair of flat elongated runners having upturned ends, respectively, a cutter bar having its opposite ends fixed to said runners, respectively, in the center thereof, a handle carrying bail journalled at its opposite ends on said runners with said opposite ends of the bail disposed directly over said opposite ends of the cutter bar, respectively, to extend between the runners for swinging movement, and a handle fixed to and extending from the center of said bail, said cutter bar comprising a double-edged blade part extending between the runners and below the level of the latter.

2. In an implement of the class described, a pair of flat elongated runners having upturned ends, respectively, a cutter bar having its opposite ends fixed to said runners, respectively, in the center thereof, a handle carrying bail journalled at its opposite ends on said runners with said opposite ends of the bail disposed directly over said opposite ends of the cutter bar, respectively, to extend between the runners for swinging movement, and a handle fixed to and extending from the center of said bail, said cutter bar comprising a double-edged blade part extending between the runners and below the level of the latter, said blade inclining downwardly from its ends to its transverse center to facilitate its cutting into the surface of the ground.

WILLIAM E. BOUTON.